United States Patent
McLaren

[15] 3,649,228
[45] Mar. 14, 1972

[54] USES OF ARYL-SUBSTITUTED POLYALKYLENE POLYMERS

[72] Inventor: Robin A. McLaren, Ballwin, Mo.

[73] Assignee: Petrolite Corporation, Wilmington, Del.

[22] Filed: Feb. 20, 1970

[21] Appl. No.: 13,200

[52] U.S. Cl............................................44/62, 44/66, 44/70, 44/77, 44/80, 252/59, 117/122 H, 117/161 UF
[51] Int. Cl............................................C10l 1/16, C10l 1/18
[58] Field of Search.................44/62, 66, 70, 77, 80; 252/59; 117/122 H, 161 UF; 260/96 HA

[56] References Cited

UNITED STATES PATENTS

| | | | |
|---|---|---|---|
| 3,037,850 | 6/1962 | Wythe et al.............................. | 44/62 |
| 3,245,766 | 4/1966 | Lifson et al............................... | 44/62 |
| 3,248,186 | 4/1966 | Brownawell et al. ..................... | 44/62 |
| 3,417,010 | 12/1968 | Henselman et al...................... | 44/62 X |

*Primary Examiner*—Daniel E. Wyman
*Assistant Examiner*—W. J. Shine
*Attorney*—Sidney B. Ring

[57] ABSTRACT

Aromatic-substituted polyalkylene polymers prepared for example by reacting (1) halogenated polyalkylene polymers, such as halogenated polyolefins, etc., with (2) alkylatable aromatic compounds such as benzene, naphthalene, substituted derivatives thereof, etc., to yield aromatic-substituted polyalkylene polymers. These products are useful as pour depressants for fuels, wax crystallization regulators, etc.

14 Claims, No Drawings

USES OF ARYL-SUBSTITUTED POLYALKYLENE POLYMERS

The aromatic-substituted polyalkylene-type polymers of this invention are prepared by reacting halogenated polyalkylene-type polymers with aromatic compounds capable of being alkylated. By the preferred method, alkylation is carried out in the presence of a Friedel-Crafts catalyst. This reaction may be idealized as follows:

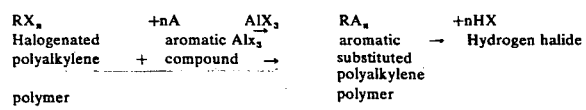

| RX$_n$ | +nA | AlX$_3$ | RA$_n$ | +nHX |
|---|---|---|---|---|
| Halogenated polyalkylene polymer | aromatic compound | AlX$_3$ → | aromatic substituted polyalkylene polymer | Hydrogen halide |

In the above idealized equation all of the halogens are removed. However, the invention also includes aromatic-substituted polyalkylene-type polymers where less than all of the halogens are reacted, such as in the following equation:

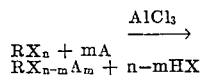

$$RX_n + mA \xrightarrow{AlCl_3} RX_{n-m}A_m + n-mHX$$

A wide variety of halogenated polyalkylene-type polymers can be reacted. In general, a polyalkylene-type polymer is one whose predominant unit is a linear —CH$_2$— unit. It may also include other alkylene-derived groups such as H(CH$_2$)$_n$ units, e.g., CH$_3$—, C$_2$H$_5$—, C$_3$H$_7$—, C$_4$H$_9$—, C$_6$H$_{13}$, C$_{16}$H$_{33}$, etc., which may be terminal, pendant from the main chain, etc., as illustrated in the following formulae:

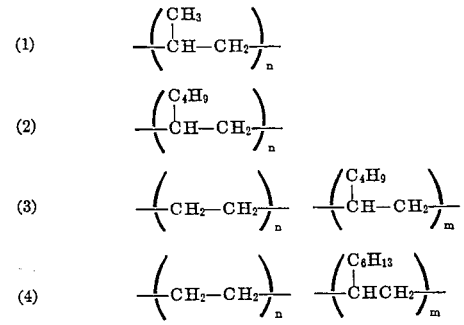

(1) $-\left(\underset{\underset{\text{CH}_3}{|}}{\text{CH}}-\text{CH}_2\right)_n-$ (2) $-\left(\underset{\underset{\text{C}_4\text{H}_9}{|}}{\text{CH}}-\text{CH}_2\right)_n-$ (3) $-\left(\text{CH}_2-\text{CH}_2\right)_n- \left(\underset{\underset{\text{C}_4\text{H}_9}{|}}{\text{CH}}-\text{CH}_2\right)_m-$ (4) $-\left(\text{CH}_2-\text{CH}_2\right)_n- \left(\underset{\underset{\text{C}_6\text{H}_{13}}{|}}{\text{CH}}\text{CH}_2\right)_m-$ The m units of (3) and (4) are branching groups which may occur in a fixed, recurring or random fashion.

In addition, side chains may be grafted on the main chain at the p sites, etc.

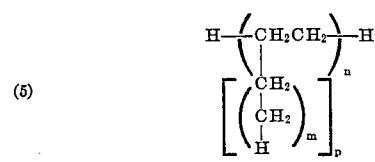

(5) $\text{H}-\left[\left(\underset{\underset{\underset{\underset{\text{H}}{|}}{\text{CH}_2}}{|}}{\text{CH}_2\text{CH}_2}\right)_n \left(\underset{\text{CH}_2}{\text{CH}_2}\right)_m\right]_p-\text{H}$ It should be understood that in polyalkylene-type polymers minor amounts of other groups may also be present such as olefin groups (C=C), hydroxyl groups (OH) carbonyl groups MC=O), etc.

The halogen-containing polymers of this invention are those polyalkylene-type polymers in which hydrogens are replaced by halogens. Thus, the polymers in addition to methylene or branched methylene units contain

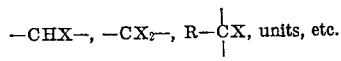

—CHX—, —CX$_2$—, R—$\overset{|}{\text{C}}$X, units, etc.

(where X is halogen and R is a branch unit), whether linear, branched, graft, copolymeric, homopolymeric, etc. In certain instances halogen may add across the minor amounts of unsaturated bonds present in the polymer.

The halogen-containing polymers of this invention include those polymers formed by halogenating hydrocarbon polyalkylene-type polymers as well as those polymers made by polymerizing or copolymerizing halogen-containing monomers.

The following are illustrative:

1. Halogenated mono-olefin-derived polymers, for example, derived from ethylene, propylene, butene, pentene, hexene, heptene, octene, dodecene, octadecene, etc., such as those having terminal unsaturation. They are preferably polymers derived from lower olefins, such as ethylene or copolymers of ethylene with other olefins, but most preferably from ethylene or copolymers of ethylene, with hexene, octene and higher olefins such as octadecene. These are generally prepared by halogenating polyalkylene-type polymers.

2. Halogen-containing polyalkylene-type polymers derived from halogen-containing monomers, for example, vinyl halides, vinylidene halides, 1,2-dihaloethylenes, dihalobutenes, etc., either polymerized alone or copolymerized with olefins such as ethylene, propylene, butene, pentene, hexene, heptene, octene, dodecene, octadecene, etc., or mixtures thereof. These polymers may be used as such or further halogenated to a desired halogen content.

3. Mixtures of one or more of the above.

4. Other similar or analogous polymers.

These polymers may be random, block, graft, etc., straight-chained or branched, etc. The polyalkylene-type polymer molecule may contain, for example, at least about 40 carbon atoms, such as from about 45 to 700 or more carbon atoms, for example from about 55 to 500 carbon atoms, but preferably from about 65 to 300 carbon atoms; and a halogen weight content of about 25 percent, such as from about 10 to 40 percent, for example from 15 to 35 percent but preferably about 20 to 30 percent, based on total weight of halogenated polymer.

The desired number of carbon atoms in the polyalkylene-type polymer molecule will, however, be dependent on the presence or absence and type of branching, the molecular weight distribution, the halogen to be added, the conditions of halogenation, the particular application, etc. In general when the branching is increased it is advantageous to increase the molecular weight. Similarly the desired halogen content of the product will vary with the various factors as described below. However, in general, optimum properties are obtained where the percent chlorine is from about 10 to 35 percent, such as about 15 to 30 percent, but preferably 20 to 30 percent. In practice 15 to 30% chlorine is generally employed. For example, in practice I prefer to chlorinate a copolymer of ethylene and 1-octene containing about 13% octene by weight and having a molecular weight of about 3,400 to a chlorine content of 17 to 21 percent.

Other preferred polymers are a. A polyethylene of 2,000–3,000 M.W. and a penetration (ASTM D1321) of 3–5, chlorinated to 18 to 21% chlorine.

b. A high density polyethylene having a M.W. of about 1,900, chlorinated to 18–28% chlorine.

Although chlorine is generally used for a variety of reasons, including economics, other halogens can also be employed, for example bromine, iodine, etc. The polymers may contain more than one kind of halogen.

In general, polyalkylene-type polymers are halogenated at a temperature ranging from their melting point to about 200° C. but preferably close to melting point. They may also be halogenated in solution or suspension at temperatures above or below the melting point.

The following examples are presented for purposes of illustration and not of limitation. In general, the polyalkylene-type polymer is melted, and chlorine bubbled into the stirred melt at the desired temperature until the desired halogen content is obtained. % chlorine is determined by Schoniger Analysis.

Since all examples were similarly prepared and to save repetitive details, the examples are presented in the following Tables.

TABLE I

| Ex. | Original hydrocarbon type | M.W. | Number of carbon atoms | Density | Process time (min.) | Chlorination temp. (° C.) | Product, percent Cl |
|---|---|---|---|---|---|---|---|
| 1 | Polyethylene | 1,500 | 105 | 0.94 | 135 | 125 | 27.8 |
| 2 | do | 3,200 | 225 | 0.91 | 165 | 130 | 23.8 |
| 3 | do | 3,500 | 250 | 0.93 | 225 | 125 | 28.2 |
| 4 | do | 3,700 | 265 | 0.89 | 185 | 115 | |
| 5 | do | 3,700 | 265 | 0.89 | 60 | 150–210 | |
| 6 | do | 5,000 | 360 | 0.92 | 120 | 140 | 23.0 |
| 7 | do | 7,000 | 500 | 0.91 | 120 | 160 | 20.0 |
| 8 | do | 2,200 | 155 | 0.92 | 210 | 130 | 23.5 |
| 9 | do | 1,925 | 135 | 0.96 | 90 | 140 | 18.0 |
| 10 | do | 1,925 | 135 | 0.96 | 105 | 140 | 22.75 |
| 11 | do | 1,925 | 135 | 0.96 | 125 | 140 | 27.5 |
| 12 | do | 2,500 | 180 | 0.92 | 240 | 130 | 12.6 |
| 13 | do | 2,500 | 180 | 0.92 | 290 | 130 | 18.4 |
| 14 | do | 2,500 | 180 | 0.92 | 300 | 130 | 20.3 |

TABLE II

| Ex. | Original hydrocarbon copolymer of ethylene and | Weight percent ethylene | M.W. | Total number of carbon atoms | Process time (min.) | Chlorination temp. (° C.) | Product, percent Cl |
|---|---|---|---|---|---|---|---|
| 15 | Propylene | 95 | 1,700 | 120 | 90 | 130 | 20.0 |
| 16 | do | 92 | 2,500 | 180 | 120 | 130 | 20.7 |
| 17 | do | 91 | 3,400 | 240 | 120 | 130 | 26.7 |
| 18 | Hexene-1 | 90 | 1,700 | 120 | 90 | 130 | 20.6 |
| 19 | do | 88 | 2,500 | 180 | 150 | 130 | 19.4 |
| 20 | do | 85 | 3,400 | 240 | 90 | 130 | 21.8 |
| 21 | Octene-1 | 87 | 2,500 | 180 | 120 | 130 | 17.5 |
| 22 | do | 87 | 3,400 | 240 | 105 | 130 | 22.5 |
| 23 | do | 87 | 3,400 | 240 | 165 | 130 | 20.3 |
| 24 | Octadecene-1 | 70 | 2,500 | 180 | 135 | 130 | 19.3 |

The following examples illustrate the preparation of the halogenated polyalkylene-type polymers by polymerization of a halogen-containing monomer.

EXAMPLE 25

A 1-liter autoclave was charged with 400 ml. benzene, 1 ml. di-t-butyl peroxide and 10 ml. vinyl chloride and ethylene added to give a pressure of 950 p.s.i.g. The temperature was raised to 130° and maintained for 18 hours. The pressure at 130° was 1,300 to 1,450 p.s.i.g. The autoclave was then cooled, the pressure released and the solvent removed under reduced pressure. The product had a molecular weight of 1,690 (90 carbons) and a chlorine content of 9.5 percent.

Since other Examples are similarly prepared and to save repetitive details, the examples are presented in the following Table III.

TABLE III

| Ex. | Catalyst | Quantity, ml. | Ethylene pressure, p.s.i.g. | Vinyl chloride, ml. | Reaction Temp., ° C. | Reaction Time, hrs. | Product MW | Product Percent Cl | C atoms |
|---|---|---|---|---|---|---|---|---|---|
| 26 | Di-t-butyl peroxide | 1 | 1,200 | 20 | 130 | 8 | 1,120 | 29.6 | 55 |
| 27 | do | 1 | 1,250 | 30 | 130 | 20 | 1,060 | 23.4 | 58 |
| 28 | Benzoyl peroxide | (1) | 1,000 | 30 | 85 | 5 | 1,750 | 21.0 | 100 |

1 2 grams.

Theoretically when the halogenated polymers are formed, the orientation and arrangement of the halogens in the molecule can vary depending on the conditions of halogenation, the original polymer which is halogenated, the nature of the halogen, the conditions under which the halogen-containing monomer is polymerized, etc.

Halogenation may occur in a block-wise fashion or in a more random fashion, for example Blockwise

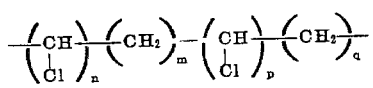

Random

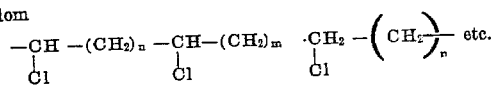

The amount and type of branching in the polyalkylene-type polymer can also influence the type of halogenation. In addition, where monomers are polymerized or copolymerized they may do so in a random or block fashion. Furthermore, when halogen-containing monomers are polymerized and then further halogenated the type of halogen addition may be dependent on the particular halogen-containing polymer halogenated, the conditions of halogenation, etc.

Thus, the optimum content of halogen in the polymer will depend on a variety of factors. For example, even if the halogen content of two different polymers is the same, their suitability may vary with molecular weight, the degree of branching, the arrangement of the halogens in the polymer, the method of halogenation, the type of application in which the products of this invention are employed, etc.

Any aromatic compound leading to a useful product can be alkylated. These include monocyclic hydrocarbons such as benzene, and substituted derivatives thereof such as alkyl and polyalkyl benzenes for example toluene, xylene, trimethyl benzene, ethyl benzene, etc.; polycyclic hydrocarbons such as naphthalene, phenanthrene, anthracene, biphenyl, etc., and substituted derivatives thereof; aromatic compounds containing other atoms besides hydrocarbons such as anisole, diphenylether, acetanilide, phenol, substituted phenol, for example tert-butyl phenol, phenyl-phenol, etc.

The alkylation reaction is carried out under Friedel-Crafts conditions, for example at at temperature of from about −70° to 150° C., such as from −30° to 125° C., for example from about −10° to 100° C. It is convenient to carry out the reaction at ambient temperature, preferably about 25° C.

An excess of the aromatic compound is conveniently used as solvent, but other suitable solvents may also be used, for example, o-dichlorobezene, nitrobenzene, carbon disulfide, etc.

The term "Friedel-Crafts catalyst" means any compound capable of catalyzing alkylation such as metal halides, for example aluminum chloride, ferric chloride, boron tri-fluoride, antimony pentachloride, zinc chloride, titanium tetrachloride, etc. Mineral acids may also be used, for example hydrogen fluoride, sulfuric acid, phosphoric acid, etc.

The Friedal-Crafts reaction is so well known that further details are unnecessary. Further description of the Friedel- Crafts reaction can be found in "Friedel-Crafts and Related Reactions", Editor George A. Olah, Interscience (1963-64).

The following examples illustrate the reaction of halogenated polyalkylene polymers with aromatic compounds in accord with this invention to prepare aromatic substituted polyalkylene polymers.

EXAMPLE A

The halogenated polyalkylene polymer of Example 13 was reacted with toluene in the following manner.

The polymer (80g.) was dissolved in 800 ml. of toluene and stirred with 16 g. aluminum chloride for 24 hours at 23°-28° C. The product was precipitated by pouring the solution into 2,000 ml. of methanol, washed twice by decantation with 100 ml. portions of methanol and dried on a Rinco evaporator. The product showed infra-red absorption at 12.3, 12.85 and 13.3$\mu$, indicative of a substituted toluene. The chlorinated polyethylene peak at about 8$\mu$ was absent.

Other halogenated polyalkylene polymers which are similarly reacted with aromatic compounds are summarized in the following table.

TABLE IV

| Ex. | Chlorinated polymer of example | Aromatic compound | Catalyst | Time, hrs. | Temperature, °C. | Solvent |
|---|---|---|---|---|---|---|
| B | 9 | Toluene | AlCl₃ | 24 | 25 | None. |
| C | 10 | do | AlCl₃ | 24 | 25 | Do. |
| D | 23 | do | AlCl₃ | 24 | 25 | Do. |
| E | 9 | Benzene | AlCl₃ | 90 | 25 | Do. |
| F | 11 | do | AlCl₃ | 90 | 25 | Do. |
| G | 9 | Trimethyl benzene.ᵃ | AlCl₃ | 24 | 25 | Do. |
| H | 10 | do | AlCl₃ | 24 | 25 | Do. |
| I | 21 | do | AlCl₃ | 24 | 25 | Do. |
| J | 12 | Anisole | AlCl₃ | 24 | 25 | CS₂. |
| K | 13 | do | AlCl₃ | 24 | 25 | CS₂. |
| L | 14 | do | AlCl₃ | 24 | 25 | CS₂. |

ᵃCommercial xylene bottoms.

The aromatic substituted polyalkylene polymers can be further reacted to yield additional products, for example, 1. Alkylation with an olefin or an alkyl halide.
2. Acylation for example with an acid halide or an anhydride.
3. Miscellaneous reactions, such as nitration, sulfonation, etc.
4. The above products may be further modified for example by reduction and esterification, reduction and amidification, etc.

The aromatic-substituted polyalkylene polymer may be alkylated with alkyl halides such as those of the formula $RX_n$ where R is alkyl, alkenyl, aryl, aralkyl, alkaryl, cycloalkyl, cycloalkenyl, etc., and X is a halogen, preferably chlorine, and n is a number 1, 2 etc., but preferably 1. Preferably R is a higher alkyl, i.e., having at least seven carbons, for example seven to 40 carbons or more, but preferably 12-30 carbons.

Alkylation may also be effected by means of olefins, for example, any of the olefins disclosed herein for preparing the polyalkylene polymer. Preferably one employs higher olefins such as those resulting from the polymerization of ethylene which are known as high molecular weight higher olefins for example those having greater than eight carbon atoms, for example from about 10 to 40 carbon atoms, but preferably from about 12 to 30 carbon atoms.

The acylated derivatives are generally prepared by reacting an acyl containing compound such as an acyl halide under Friedel-Crafts conditions for example a compound of the formula

where R is alkyl, aryl, alkaryl, aralkyl, cycloalkyl, etc., and X is a halide, i.e., chlorine, bromine, etc., and n is a number 1, 2 etc., but preferably 1.

R is preferably alkyl, i.e., methyl, ethyl, propyl, butyl, pentyl, etc.

Preferably the alkyl group has greater than about six carbon atoms, such as from about seven to 30 carbon atoms but preferably from about 10-20 carbon atoms.

The following examples are presented for purposes of illustration.

EXAMPLE M

This example illustrates further reaction by acylation.

The product of Example A (3.3 g.) was dissolved in 50 ml. carbon disulfide and stirred with 3.7 g. lauroyl chloride and 2.5 g. aluminum chloride for 2 hours. The product was isolated by washing the carbon disulfide solution four times with water and drying on a Rinco evaporator. An infra-red peak at 5.9$\mu$ indicated formation of an aromatic ketone.

EXAMPLE N

This example illustrates further reaction by alkylation.

The product of Example C (10 g.) was dissolved in 300 ml. cyclohexane and the solution warmed to dissolve 12 g. of $C_{22-28}$ alpha-olefin. The resulting solution was cooled to 25° C., 2 g. aluminum chloride added and stirred at 25° for 17 hours. The product was isolated by precipitation with methanol, washing with methanol and drying on a Rinco evaporator. Infra-red bands at 10.1 and 11.0$\mu$ were absent (no alpha-olefin) and a reduction in intensity of the 12.3$\mu$ band (two adjacent hydrogen) indicated further substitution of the aromatic ring.

This invention relates to the use of aromatic-substituted polyalkylene-type polymers as additives for systems in which it is desirable to control the growth of wax crystals. These polymers are particularly useful in hydrocarbon systems, such as petroleum systems, from which wax crystals separate. By controlling crystal growth, i.e., as wax crystallization regulators, desirable attributes are imparted to the system.

The amounts of aromatic-substituted polymer employed will vary with the particular polymer and the particular system. In general one employs in solvent systems at least about 20 p.p.m., such as from about 20-5,000 p.p.m., or more, advantageously from about 30-3,000 p.p.m., for example, from 50-500 p.p.m., with an optimum of 100-300 p.p.m. Larger or smaller amounts can be employed but the amount employed in practice is determined by economic considerations. In solvent-free systems larger amounts may be employed such as 0.1 to 10 percent, for example 0.2 to 5 percent, but preferably 0.5 to 2 percent.

USE AS POINT DEPRESSANT

This phase of the present invention relates to the use of aromatic substituted polyalkylene-type polymers in improving the lowe temperature characteristics, such as the flow and pour point characteristics, of hydrocarbon fuels; and more particularly relates to the use of these polymers in preparing improved low cold-test hydrocarbon fuels, in particular heating oils, diesel fuels, residual fuels, aviation, and other fuels that are subject to low temperatures.

With increases in the use of hydrocarbon fuels of all kinds, a serious problem has arisen in areas frequently subject to low temperatures in relation to the cold temperature characteristics of fuels. Similar problems are encountered with jet aircraft operating at altitudes having temperatures of −50° F. or lower. Particularly serious problems have been encountered with heating oils and diesel fuels that have too high a pour point, resulting either in distributional or operating difficulties or both. For example, the distribution of heating oils by pumping or syphoning is rendered difficult or impossible at temperatures around or below the pour point of the oil. Furthermore, the flow of the oil at such temperatures through the filters cannot be maintained thus leading to the failure of the equipment to operate.

I have now discovered that the low temperature flow and pour point characteristics of hydrocarbon fuels are improved by incorporating an additive comprising minor amounts of aromatic substituted polyalkylene-type polymers in the fuel.

The fuel is a hydrocarbon oil, such as for example, a diesel fuel, a jet fuel, a heavy industrial residual fuel (Bunker C, No. 6), a furnace oil, a heater oil fraction, kerosene, a gas oil, or any light oil, Of course, any mixtures of fuel oils are also intended. The fuel oil may be virgin or cracked petroleum distillate fuel oil. The distillate fuel oil may advantageously boil in the range of from about 200° to about 750° F., and preferably in the range of 350° to 650° F. The distillate fuel oil may contain or consist of cracked components, such as for example, those derived from cycle oils or cycle oil cuts boiling heavier than gasoline, usually in the range of from about 450° to about 750° F. and may be derived by catalytic or thermal cracking. High-sulfur-containing and low-sulfur-containing oils such as diesel oils and the like may also be used. The distillate oil may, of course, contain other components such as other additives used to perform particular functions, for example, rust inhibitors, corrosion inhibitors, anti-oxidants, sludge stabilizing compositions, etc. Aviation turbo-jet fuels in which the polymers may be used normally boil between about 250° and 550° F. and are used in both military and civilian aircraft. Such fuels are more fully defined in U.S. Military Specifications MIL–F–5624C, MIL–F–25554A, MIL–F–25558A, and amendments thereto. They include fuels of the JP series for example JP–1, JP–4, JP–5, etc. Kerosenes and heating oils will normally have boiling ranges between about 300° and about 750° F. and are more fully described in ASTM Specification D–396-4 and supplements thereto, where they are referred to as No. 1, and No. 2 fuel oils. Diesel fuels are described in detail in ASTM Specification D–975–64–T and later versions of the same specification.

They also include marine, automotive, stationary diesel fuels: Residual fuels are described in ASTM Specifications D–396-4T and D–975-64T where they are referred to as No. 4–D, No. 4, No. 5 and No. 6 fuel oils. They are characterized by a viscosity in the range 45–9,000 Saybolt Universal Seconds at 100° F.

The following examples are presented to illustrate the improvements obtained by employing the composition of this invention in improving the pour point of fuels. All pour points were obtained by ASTM Method D–97–57.

The fuel oil compositions were also evaluated using a Fluidity Test. The Fluidity Test measures the flow characteristics of fuel oils through a narrow orifice. Briefly, the test involves measuring the amount of fuel oil which flows through an orifice in a given time at a given temperature. The testing device consists of a two-compartment cylinder connected by means of a capillary tube one-half inch long and 2.25 mm. inside diameter. Each chamber is calibrated. Forty milliliters of the fuel oil to be tested are placed in one chamber of the cylinder; the cylinder is capped, inverted so that the fuel will not run into the other chamber, and placed in a bath set at the desired temperature for 2 hours. At the end of this time, the cylinder is inverted so that the cooled fuel now can run through the capillary tube into the second chamber. The test apparatus is kept in the cooling bath while the fuel is allowed to flow for 3 minutes. At this point, the amount of fuel which has flowed through is measured. It is reported as percent recovery of total fuel sample used. The higher the percent of fuel which passes through, the better cold-flow the fuel composition has. Thus, for example if 20 ml. of fuel oil flows from the first chamber to the second chamber, the Fluidity Recovery is 50 percent.

The results are presented in the following table.

TABLE VI

| Example | Product of Example | Distillate fuel E | | Fuel F | |
|---|---|---|---|---|---|
| | | Concentration, p.p.m. | Percent recovered in 3 min., −30° F. | Concentration, p.p.m. | Percent recovered in 3 min., −30° F. |
| 15a | | | 0 | | 0 |
| 16a | B | 43 | 83 | 160 | 63 |
| 17a | B | 58 | 90 | 200 | 70 |
| 18a | C | 43 | 58 | | |
| 19a | C | 58 | 75 | | |
| 20a | C | 75 | 93 | | |

USE IN RESIDUAL FUEL

EXAMPLE 21a

The fuel used was a blend of 35 percent heavy furnace oil derived from Middle East crude, 50 percent heavy furnace oil derived from Sumatra crude and 15 percent kerosene.

A sample of this fuel was heated to 200° F. for 1 hour, cooled to 30° F. over a period of 11 hours in a modified Fluidity tube, warmed to 68° F. and inverted. The tube was slowly warmed and the volume of oil recovered at various temperatures recorded. Recovery was 0 percent at 69° F. and 75 percent at 74° F.

A sample of the same fuel containing 0.25 percent of the product of Example M was treated in exactly the same way. Recovery at 69° F. was 75%.

This phase of the invention relates to the use of aromatic-substituted polyalkylene-type polymers as additives for systems in which it is desirable to control the growth of wax crystals and to systems containing such polymers. These polymers are particularly useful in hydrocarbon systems, such

TABLE V

| Example | Product of example | Distillate fuel A, 100 p.p.m., ° F. | Distillate fuel B, 100 p.p.m., ° F. | Distillate fuel C, 200 p.p.m., ° F. | Distillate fuel D, 75 p.p.m., ° F. |
|---|---|---|---|---|---|
| 1a | | −5 | −5 | 0 | 0 |
| 2a | B | −40 | | | |
| 3a | C | −30 | | | |
| 4a | D | (¹) | | | |
| 5a | E | | (¹) | | |
| 6a | F | | (¹) | | |
| 7a | G | −30 | | | |
| 8a | H | −15 | | | |
| 9a | I | (¹) | | | |
| 10a | J | | | −15 | −20 |
| 11a | K | | | −25 | −30 |
| 12a | L | −20 | | −15 | −20 |
| 13a | M | | −15 | | |
| 14a | N | | | −40 | −20 |

¹ Below −50.

as petroleum systems, from which wax crystals separate. By controlling or regulating crystal growth in solutions or melts, desirable attributes are imparted to the system as illustrated by the following:

1. Use in microcrystalline waxes such as those employed as casting waxes.
2. Use as refinery dewaxing aids.
3. Use in wax coatings.
4. Use in wax containing adhesives.
5. Use in wax containing inks.

The following are non-limiting examples of wax-containing systems in which the aromatic substituted polymers can be used.

1. Use in microcrystalline waxes employed as Casting Waxes.

This phase of the invention relates to wax compositions, and more particularly to microcrystalline waxes having a minor quantity of the above aromatic-substituted polymers incorporated therein.

Microcrystalline waxes derived from petroleum are well known and have been employed for many uses. Attempts have been made to use microcrystalline waxes for preparing molds used for the precision casting of metal articles. Such attempts, however, are often not entirely satisfactory, since wrinkles form on the surface of microcrystalline waxes when they are solidified from the molten state. Accordingly, when used for the preparation of molds for subsequent use in precision metal casting, wrinkles formed in the wax surface are impressed upon the surface of the mold. The wrinkled surface of the mold in turn impresses a wrinkled surface on the metal or metal alloy cast thereon. The resulting metal casting must then be machined to achieve a smooth surface.

This phase of the present invention provides a new microcrystalline wax composition especially suitable for use in producing molds which can be used for the precision casting of metal articles.

The incorporation of a minor quantity of the aromatic-substituted polymers in a microcrystalline wax of petroleum origin yields a microcrystalline wax composition having improved properties. Thus, the microcrystalline wax compositions of this invention form a smooth, wrinkle-free surface when solidified from the molten state. The resulting smooth surface renders the new wax compositions especially suitable for the preparation of molds for the precision casting of metal articles. Since the surface imparted to the mold by the wax is smooth, the surface of the resulting metal casting is smooth and does not require machining.

Microcrystalline waxes which can be used to prepare the compositions of the invention are derived from the heavy fractions of petroleum, residual fractions producing especially suitable waxes. The microcrystalline waxes which can be used should have a melting point of at least 135° F., and preferably of at least 150° F., for example from about 150° F. to 198° F. The viscosity of the microcrystalline wax should be above about 55 SUS at 210° F. The oil content of the wax should be less then about 5 percent, and is preferably less than about 2 percent. The microcrystalline waxes are generally prepared by dewaxing a petroleum residuum fraction. Advantageously this is accomplished by dissolving a petroleum residuum fraction in a dewaxing solvent such as methyl ethyl ketone, and chilling the resulting solution to a relatively low temperature, say from about 5° to −20° F., to precipitate a major portion of the wax therefrom. The resulting microcrystalline wax can advantageously be subjected to additional deoiling steps such as by further dissolution in a solvent and crystallization at a relatively low temperature, or by repulping the wax in a solvent and separating the wax from solvent.

The entire portion of the microcrystalline wax so prepared can be employed to prepare the composition of the invention, or any fraction separated therefrom such as by fractional crystallization, and blends of such fractions, can be used. It is especially advantageous to use blends of microcrystalline wax having different physical properties, such as different melting points, in order to obtain specifically desired properties of the final wax product, in addition to the ability of the final wax composition of the invention to form smooth surfaces.

EXAMPLE 1B

A casting prepared from a microcrystalline wax characterized by melting point of 195° F. and a penetration (A.S.T.M. D1321) of 3 showed gross wrinkling of the surface. A casting similarly prepared from a blend of 99 percent of the above wax and 1 percent of the product of Example M had a smooth, wrinkle-free surface.

2. Use as a Refinery Dewaxing Aid.

This phase of the invention also relates to the use of aromatic-substituted polymers as dewaxing aids for refineries. They produce a well-defined, more uniformly sized wax crystal that can be readily filtered to a compact, but porous cake which is easily washed and dried. The refiner can use dewaxing aids to increase plant capacity during peak demand periods or use them to run the plant more efficiently during slack periods.

These aromatic-substituted polymers offer the refiner one or more of the following process improvements:
a. Increased filter rates
b. Higher dewaxed oil yields
c. Lower oil content waxes
d. Reduced solvent dilution
e. Improved wax yields In one aspect, this phase of the invention relates to an improved process for the dewaxing of oils. In another aspect, the invention relates to the utilization of the above aromatic-containing polymers in a dewaxing system. In still another aspect, the invention relates to the utilization of these aromatic-substituted polymers in the reclaimed solvent in a dewaxing operation. In a further aspect, the invention relates to the operation of a dewaxing system at lower temperatures without plugging the filter by adding the halogen-containing polymers to the solvent prior to the cooling of the solvent.

In the solvent dewaxing of hydrocarbon oils, a diluent material is added to the waxy oil, and the solution is then chilled to a temperature at which the wax or a substantial portion thereof is precipitated. The wax is then separated from the oil by filtration, centrifuging or the like. In certain of the methods, known as solvent dewaxing methods, a solvent which has a preferential solvent action for oil over wax at low temperatures, is utilized as the diluent. Solvents which can be utilized include naphthas, ketones such as methyl ethyl ketone, acetone-benzene mixtures, acetone-toluene mixtures, liquid paraffins of low boiling point such as propane, butane, pentane, and hexane, and chlorinated hydrocarbons such as dichloroethane and trichlorethane. These solvents, being very fluid at low temperatures, reduce the viscosity of the oil to such an extent that low temperatures can be obtained during the precipitation process, and as a result low pour point oils can be obtained.

In the operation of dewaxing systems, the quantity of wax extracted is directly governed by the temperature to which the wax-bearing stock is cooled, that is, the colder the temperature the more wax is precipitated from the solution. However, there are certain limitations controlling the coldest temperature obtainable. In the solvent dewaxing of oils derived from certain crudes, such as Venezuelan crude, there is a tendency for the solvent cooler to become plugged, the exchangers to become fouled resulting in increased pressure drop across the exchangers, and the time required for filtration to be increased. The lower limits on temperature on the scraped surface exchanger product slurry have been 30°–35° F. as lower temperatures increase the pressure drop across the exchanger and force a shutdown for dewaxing of the exchanger. In certain operations, the solvent which is recycled from the oily filtrate and finished wax strippers, contains a small amount (about 6 percent) light wax which is carried overhead with the solvent in the stripping operation, since perfect fractionation is not obtained and would require considerably more expensive fractionation equipment. It is the precipitation of the light wax in the solvent which plugs the solvent cooler, thus limiting the total cooling of the system and hampers the operation off the exchangers and the filters.

These difficulties can be reduced or eliminated and the dewaxing operation carried out at lower temperatures than previously obtainable by the addition of these aromatic-substituted polymers of this invention.

EXAMPLE 2B

One hundred parts of a lubricating oil stock (Viscosity 100 S.U.S. at 210° F.) was heated to 200° F. and blended with 500 p.p.m. of the product of Example F and 300 parts of pentane. The mixture was cooled to 0° F. and filtered through a Whatman No. 1 filter paper under 10 inches of mercury pressure. The volume of filtrate collected in 2 minutes was 22 ml. In a similar example omitting the product of Example F only 5 ml. of filtrate was collected.

3. Use in Wax Laminants, Coatings, Adhesives, etc.

Waxes are widely used in many applications including (1) laminants, (2) coatings and (3) adhesives, etc., because of their inertness, water vapor and gas transmission characteristics, freedom from odor and taste, and heat sealability. However, in many instances the waxes fail to perform as good barriers, sealants or adhesives because they lack sufficient flexibility and ductility to remain as a coherent, unbroken film under the rigorous conditions encountered in use. Because of this, many polymers and resins are blended with wax. Among the materials widely used in wax blends are butyl rubber, ethylene-vinyl acetate copolymers (E/VA), polyethylene, ethylene-vinyl acrylate copolymers and rosin-derived resins.

The aromatic-substituted polymers of this invention are useful in controlling, modifying or regulating the growth of wax crystals in such compositions so as to yield improved compositions. These include compositions in which wax is used alone or in combination with other additives such as polymers, resins, etc. Waxes include paraffin wax, microcrystalline wax, scale wax, and other petroleum waxes, Fisher-Tropsch waxes, synthetic waxes, etc.

EXAMPLE 1C

A laminate of aluminum foil to aluminum foil was prepared by coating with a mixture of ethylene-vinyl acetate copolymer (Elvax 250), 35 percent, and paraffin wax, 65 percent, at 180° F. and sealing at 300° F. under 30 p.s.i. for 0.5 seconds. The seal strength (90° pull, 1 in./min. separation rate) was 18 gm./in. When a blend of Elvax 250, 33 percent, paraffin wax, 65 percent, and the product of Example I, 2%, was similarly used in the seal strength was 140 gm./in.

EXAMPLE 2C

A coating consisting of paraffin wax, 42 percent, 180° F. m.p. microcrystalline wax, 23 percent, and ethylene vinyl acetate copolymer, 35 percent, when applied to folding paperboard stock was improved in gloss, gloss-retention and slip properties by the addition of about 0.5 percent of the product of Example L.

4. These aromatic-substituted polymers can also be employed to modify the properties, especially the low temperature properties of wax-containing inks such as carbon paper inks which are stored or used at low temperatures such as business forms, etc.

EXAMPLE 3C

A carbon paper ink containing paraffin wax, 30 percent, 300 viscosity ink oil, 30 percent, synthetic ink wax (Petrolite WB-7), 10 percent, and furnace black, 30 percent, when coated on business form stock gave satisfactory performance at normal indoor temperatures. However, below about 30°–40° F. poor image transfer occurred. The above ink with the addition of 1 percent of the product Example N gave satisfactory image transfer even at 0° F.

The above examples of wax-containing systems are merely illustrative.

All of the above systems were illustrated by specific aromatic-substituted polyalkylene-type polymers. In addition, the desired improvements in these systems are also obtained by employing other aromatic-substituted polyalkylene type polymers including those specifically disclosed in Table IV.

In addition, these aromatic-substituted polyalkylene-type polymers can also be employed in other wax-containing systems as wax crystallization regulators.

As is quite evident, additional aromatic compounds and new halogen-containing polyalkylene-type polymers are known or will be constantly developed which can be reacted with each other to yield products useful in this invention. It is, therefore, not only impossible to attempt a comprehensive catalogue of such aromatic compounds and polymers, but to attempt to describe the invention in its broader aspects in terms of specific chemical names would be too voluminous and unnecessary since one skilled in the art could by following the description of the invention herein select a useful aromatic compound and polymer. This invention lies in the suitable aromatic-substituted polymers in lowering pour point and in modifying, regulating or controlling wax crystal growth, and the individual compositions are important only in the same that their properties can affect these functions. To precisely define each specific useful aromatic-substituted polymer in light of the present disclosure would merely call for chemical knowledge within the skill of the art in a manner analogous to a chemical engineer who prescribes in the construction of a machine the proper materials and the proper dimensions thereof. From the description in his specification and with the knowledge of a chemist, one will know or deduce with confidence the applicability of specific aromatic-substituted polymers suitable for this invention by applying them as set forth herein. In analogy to the case of a machine, wherein the use of certain materials of construction or dimensions of parts would lead to no practical useful result, various materials will be rejected as inapplicable where others would be operative. One can obviously assume that no one will wish to employ a useless aromatic-substituted polymer nor will be misled because it is possible to misapply the teachings of the present disclosure to do so. Thus, any aromatic-substituted polymer than can perform the function stated herein can be employed.

Having thus described my invention what I claim as new and desire to obtain by Letters Patent is:

1. A hydrocarbon composition comprising a major amount of hydrocarbon and a sufficient amount, to regulate wax crystal growth, of an aromatic-substituted polyalkylene polymer prepared by reacting, under Friedel-Crafts conditions, (1) a polyalkylene polymer having at least 40 carbon atoms and a halogen content of at least 10 percent by weight with (2) an aromatic hydrocarbon compound.

2. The hydrocarbon composition of claim 1 wherein said aromatic-substituted polyalkylene polymer is further alkylated of acylated under Friedel-Crafts conditions.

3. The hydrocarbon composition of claim 1 wherein said hydrocarbon is a hydrocarbon fuel oil subject to low temperatures, said polymer improving the low temperature pour point of said composition.

4. The hydrocarbon composition of claim 3 wherein said aromatic-substituted polyalkylene polymer is further alkylated or acylated under Friedel-Crafts conditions.

5. The hydrocarbon composition of claim 1 where the hydrocarbon is a casting wax.

6. The hydrocarbon composition of claim 2 where the hydrocarbon is a casting wax.

7. The hydrocarbon composition of claim 1 where the hydrocarbon is a refinery hydrocarbon to be filtered.

8. The hydrocarbon composition of claim 2 where the hydrocarbon is a refinery hydrocarbon to be filtered.

9. The hydrocarbon composition of claim 1 where the hydrocarbon is a wax coating composition.

10. The hydrocarbon composition of claim 2 where the hydrocarbon is a wax composition.

11. The hydrocarbon composition of claim 1 where the hydrocarbon is an adhesive wax composition.

12. The hydrocarbon composition of claim 2 where the hydrocarbon is an adhesive wax composition.

13. The hydrocarbon composition of claim 1 where the hydrocarbon is an ink wax composition.

14. The hydrocarbon composition of claim 2 where the hydrocarbon is an ink wax composition.

* * * * *